2,793,238

PREPARATION OF CYCLOPENTENE

Fred W. Banes, Westfield, Herbert K. Wiese, Cranford, and Ober C. Slotterbeck, Clark, Rahway, N. J., assignors to Esso Research and Engineering Company, a corporation of Delaware No Drawing. Application January 3, 1955, Serial No. 479,682

2 Claims. (Cl. 260—666)

This invention is concerned with a process of preparing cyclopentene by selective hydrogenation of the cyclopentadiene nucleus.

The cyclopentadiene may be in the form of a monomer, dimer or partly hydrogenated dimer, such as the dimer dihydro derivative, and alkyl or substituted derivatives of the cyclodienes. Correspondingly, methylcyclopentene is to be produced from methylcyclopentadiene monomer, dimer and derivative.

There is interest in the production of cyclopentene, particularly from the low cost cyclodienes. The cyclopentenes are characterized by a 5 carbon member cyclic nucleus with a single double bond in the nucleus. The most useful reaction for making the cyclopentenes available in the past has been the dehydration of cyclopentanol. Cyclopentenes are useful for preparing cyclic aldehydes, alcohols, chloro-compounds and fuels.

Prior to the present invention it was known that cyclopentadiene would undergo catalytic hydrogenation to form cyclopentane. As reported in Chem. Weekblad., 1903, vol. 1, 7 an article of Eijkman, cyclopentadiene is hydrogenated over nickel at 180° C. to yield cyclopentane. It has been further reported that cyclopentane under catalytic hydrogenation conditions at 300° C. undergoes ring fission to produce n-pentane (Zelinski, Berichte, vol. 66, pages 478, 419; vol. 68, page 1869).

In accordance with the present invention it has been found that cyclopentadiene can be selectively hydrogenated at 1 to 100 atmospheres to yield principally cyclopentene with relatively small amounts of cyclopentane even at elevated temperatures in the range of 25 to 600° C. and preferably of the order of 200° to 400° C. by using suitable hydrogenation catalysts, a suitable proportion of hydrogen, and by controlling the extent of conversion.

Cyclopentadiene dimer can also be used since at the preferred reaction temperature it is rapidly depolymerized to monomeric cyclopentadiene which is then partially hydrogenated to cyclopentene.

In using a highly active hydrogenation catalyst, such as finely divided metallic nickel, cobalt, or molybdenum, tungsten their oxides or sulfides, it is preferred to use such a catalyst modified with another ingredient, such as zinc oxide, manganese oxide, chromite, or other substances which tends to inhibit or lessen the catalytic hydrogenating activity. The catalyst may be used as such or it may be supported on diatomaceous earths, asbestos or other inert carriers.

The kind of catalysts employed preferably are known to those skilled in the art as mild hydrogenation catalysts as set forth in Groggins "Unit Processes of Organic Synthesis" (2nd edition, 1938, p. 460). Platinum, palladium, and their oxides belong to this class.

Experimental data have shown that a suitable proportion of hydrogen to the cyclodiene reactant for obtaining the production of cyclopentene rather than of the usually expected cyclopentane is of the order of .5 to 1.5 mole hydrogen per mole of cyclodiene (monocyclic) and preferably to 1 mole of hydrogen to 1 mole of monocyclic cyclodiene nucleus.

In using a suitable catalyst such as a modified nickel catalyst and a suitable proportion of hydrogen to react with the cyclodiene the desired high selectivity is obtained by limiting the extent of conversion. A suitable conversion is of the order of 35 to 75%. At high conversion levels, such as above 75%, the selectivity greatly favors the formation of cyclopentane and may favor the formation of undesired reaction products.

The following example is given to illustrate a preferred method of carrying out the selective hydrogenation of cyclopentadiene to cyclopentene.

Example 1

Hydrogen in proportion of 1.1 mole was mixed with each mole of cyclopentadiene monomer in a gaseous mixture passed through the reaction zone containing a catalyst which consisted of 91 mole percent Ni and 9 mole percent ZnO. At atmospheric pressure, 1190 volumes of the reaction mixture were passed per volume of catalyst reaction zone per hour to obtain a conversion of 43.7%. The reaction zone temperature was maintained at 300° C. The recovered product was analyzed to show that the selectivity was 90.6% of cyclopentene and only 9.4% of cyclopentane.

In carrying out the conversion to above 75% the selectivity toward producing cyclopentene dropped radically.

Example 2

Cyclopentadiene dimer was selectively hydrogenated to the dihydro derivative at temperatures ranging between 25–150° C. using either Raney Ni or $PtO_2$ as catalyst. Hydrogen pressures ranging from 50–200 p. s. i. g. with $PtO_2$ as catalyst and 500–1500 p. s. i. g. with Raney Ni were employed. The excess hydrogen was removed as soon as the pressure drop corresponded to one mole of $H_2$ reacted with one mole cyclopentadiene dimer.

A mixture of 67.6% by weight or by volume of dihydrodicyclopentadiene and 32.4% by weight or volume of iso-octane was passed through a heated tubular reactor at 550° C. and at a contact time of 15 seconds. Under these conditions about 20% of the dihydro derivative was converted with a selectivity of about 28% to cyclopentene and 37% to cyclopentadiene. The other 35% of cracked products identified comprised largely cyclopentadiene dimer with small quantities of benzene and toluene. This demonstrated that the cracking of the dihydro derivative can be made to give satisfactory yields of cyclopentene.

The cyclopentadiene obtained from the dihydro dimer can be further treated as in Example 1 to increase the yield of cyclopentene or it can be dimerized followed by hydrogenation to the dihydro derivative.

The cyclopentene as obtained from the cracking of the dihydro dicyclopentadiene is recovered from the cracked product by distilling the cyclopentadiene monomer and cyclopentene overhead. The overhead is then heat soaked at 50°–200° C. for several hours to effect dimerization of the cyclopentadiene monomer. From this heat soaked overhead cyclopentene can be recovered in >90% purity by distillation. The cyclopentadiene dimer remaining as bottoms may be recycled to the hydrogenation unit and converted to the dihydro derivative.

The dihydro-dicyclopentadiene can be cracked in a tubular or packed reactor at temperatures of 350° to 600° C. Contact times of 20 to 200 seconds are preferred in order to minimize cracking to low molecular weight hydrocarbons or forming aromatic compounds.

There is an advantage in using the cyclodienes converted to the dihydro-dimer form, since the dimer can be partially hydrogenated with greater control—even using more active catalysts and lower temperatures. More limited conversions are required in obtaining the cyclopentene from the dihydro-dimer by cracking, however.

The invention described is claimed as follows:

1. The process of preparing cyclopentene which comprises passing a mixture of cyclopentadiene with a controlled amount of hydrogen, of the order of 0.5 to 1.5 moles of hydrogen per mole of cyclopentadiene, into contact with a mild hydrogenation catalyst consisting essentially of metallic nickel in admixture with a small modifying amount of zinc oxide at a temperature in the range of 200° C. to 400° C. for a period in which 35 to 75% of the cyclopentadiene is converted.

2. The process according to claim 1, wherein a gaseous mixture of the cyclopentadiene and hydrogen at 300° C. is contacted with the catalyst consisting of 91 mole percent nickel and 9 mole percent zinc oxide.

References Cited in the file of this patent
UNITED STATES PATENTS 2,360,555   Evans et al. _____ Oct. 17, 1944

OTHER REFERENCES

Staudinger et al.: Concerning the Constitution of Dicyclopentadienes, Helvetica Chimica Acta (Switzerland), 1924, vol. 7, page 24 (article written in German).

David et al.: Some Derivatives of Cyclopentadienes, Bulletin de la Societe Chimique, vol. 11, pages 561–4 (1944). See also Chemical Abstracts, 1946, vol. 40, page 2438.

Emmet: Catalysis, col. 3 (1955), pp. 96–105, Rheinhold Publishing Corp., New York, N. Y.